United States Patent [19]

Winkler et al.

[11] 4,135,668
[45] Jan. 23, 1979

[54] SOAKER HOSE SUPPORT

[75] Inventors: Robert J. Winkler, Santa Ana; Colin G. Harris, Huntington Beach; Terry A. Sprague, Fullerton, all of Calif.

[73] Assignee: Alpha Nova Development Corp., Santa Ana, Calif.

[21] Appl. No.: 785,439

[22] Filed: Apr. 7, 1977

[51] Int. Cl.$^2$ ............................................. B05B 15/06
[52] U.S. Cl. ...................................... 239/276; 248/87; 248/88; 248/178
[58] Field of Search ...................................... 248/80–88, 248/75, 74 A, 187, 178, 185, 274, 514, 288 A, 291, 299, 314, 316 D; 239/276, 280.5

[56] References Cited

U.S. PATENT DOCUMENTS

| | | | |
|---|---|---|---|
| 537,771 | 4/1895 | Hirsh | 248/178 X |
| 782,461 | 2/1905 | Parker | 248/86 |
| 973,810 | 10/1910 | Regan | 248/88 |
| 2,060,390 | 11/1936 | Adams | 248/88 |
| 2,495,995 | 1/1950 | Warrens et al. | 248/82 |
| 2,573,635 | 10/1951 | Williams | 248/87 X |
| 3,334,852 | 8/1967 | Sumida et al. | 248/83 |
| 3,429,535 | 2/1969 | Herzig | 248/75 X |
| 3,941,342 | 3/1976 | Bradshaw | 248/88 |

FOREIGN PATENT DOCUMENTS

| | | | |
|---|---|---|---|
| 127267 | 9/1945 | Australia | 248/88 |
| 695986 | 8/1953 | United Kingdom | 239/280.5 |
| 782163 | 9/1957 | United Kingdom | 248/291 |

Primary Examiner—Rodney H. Bonck
Attorney, Agent, or Firm—William C. Babcock

[57] ABSTRACT

A support assembly for a flat soaker hose comprising a spike insertable into the ground, said spike including mounting provisions at the top end thereof for receiving a clamp assembly at various angular dispositions. The clamp assembly is conformed to provide a plurality of cantilevered fingers disposed in staggered opposing alignment, the interior separation between fingers being dimensioned to provide a clamping fit about the soaker hose. One exterior surface of said clamp is furthermore joined to a mounting structure variously conformed for attachment to the upper end of said spike at various angular alignment. In a first embodiment the upper end of the spike is provided with a planar or rectangular cavity extending vertically downward along or parallel to the axis of the spike and the support structure is conformed as a planar member having a plurality of elongate, coplanar elements extending at various angular alignments therefrom each element being conformed for receipt in said cavity. In various alternative embodiments, the planar support member may include a plurality of radial cutouts each conformed to engage a transverse spine extending across a vertical slot formed on the upper end of the spike, or the spike may be provided with a plurality of angularly aligned cavities extending into the top end thereof with a single element support structure being insertable in a selected one of said cavities. A further engagement structure comprising a ball receivable into a spherically deformed slit which is clamped by way of a wing nut provides the multiple degree of freedom necessary to accommodate hose disposition at various orientations.

2 Claims, 10 Drawing Figures

SOAKER HOSE SUPPORT

BACKGROUND OF THE INVENTION

1. Field of the Invention

The present invention relates to water hose deployment devices, and more particularly to improvements in soaker hose supports.

2. Description of the Prior Art

The deployment of soaker hoses is very often utilized as a substitute for a buried sprinkler system. The economies of the soaker hose and particularly the mobility thereof to various sites that need to be sprinkled are well known in the art and for that reason various supporting devices have been developed in the past for aligning the hose in a proper relationship relative the area to be sprinkled. Typically soaker hoses of the flat type, perforated on one surface only, are often utilized, the perforations being aligned to provide a wide fan out and therefore a wide dispersal of the water spray. As manufactured, such soaker hoses do normally provide an even distribution for fan out and are designed to be layed down flat. Where other than an even distribution on either side of the hose is desired the soaker hose is aligned at various inclinations from the horizontal redirecting the spray pattern. Heretofore such alignment has been achieved by way of spikes inserted into the ground onto which certain hose mounts were attached, securing the hose in the proper orientation. Most often such hose mounts required elaborate attachment sequences, and furthermore employed manipulative clamping devices which could at least partly restrict the flow through the hose.

Use of soaker hose has become more economical with the more prevalent use of plastics. The economies of plastic manufacture can similarly be used to advantage for the mounts therefor. The typical prior art friction devices utilized in the alignment mechanism are not easily achieved in plastic and for that reason alternatives therefor are desired.

SUMMARY OF THE INVENTION

Accordingly it is the general purpose and object of the present invention to provide a soaker hose support assembly comprising a spike formed to include at the upper end thereof an enlarged sectional structure through which the hammer blows are absorbed and transferred into the spike, such spikes being further provided with conforming recesses at the upper end for receiving selected elements of a support mount on the underside of a hose clamp. In a first embodiment, the structure of the hose clamp comprises a horizontally aligned rectangular side member having formed on the lateral edges thereof projecting finger elements extending in cantilever. The respective upper and lower edge finger elements are arranged in a stagger and provide a clearance therebetween substantially equal to the nominal dimension of the hose when unpressurized. The free ends of the upper and lower finger elements, furthermore, include inwardly turned beads, which because of their lesser separation will retain a flaccid hose therebetween. Extending from the underside of one of the lower head finger elements is the aforementioned support mount, again variously configured according to the description following.

In order to achieve various angular alignments of the clamp relative the spike, the support structure is configured to provide engaging members insertable at various angular dispositions into the upper end of the spike. Alternatively, the clamp may be attached to a ball swival mount and the upper end of the spike is provided with a split ball seat drawn tight by a wing nut arrangement.

This same supporting structure may be utilized with other embodiments of a hose clamp disclosed herein including a hose clamp comprising a rectangular plate having angulated tabs extending inwardly from the edges thereof in a staggered alignment. By virtue of these tabs, in particularly the staggering thereof, the edges of a flat soaker hose are grasped by the clamp and subsequent pressurization of the hose further increases the securing interlock therein.

It is to be noted that in each instance reliance is made in the construction of the mount assembly on plastic castings which provide the requisite economic benefits set out. Additional benefits of the use of plastics in this instance is the relatively low spring constants thereof, allowing convenient insertion of the hose.

According to the above summary it is the primary object of the present invention to provide a soaker hose mounting structures which is economical in manufacture and reliable in use.

Other objects of the invention are to provide soaker hose mounts which are convenient in assembly and require no tooling on installation.

Yet other objects of the invention are to provide soaker hose mounts which are conformed for installation at various angular alignments.

These and further objects will be appreciated at length when considered in light of the drawings and the specifications following.

DESCRIPTION OF THE PREFERRED EMBODIMENT

Figure 1:
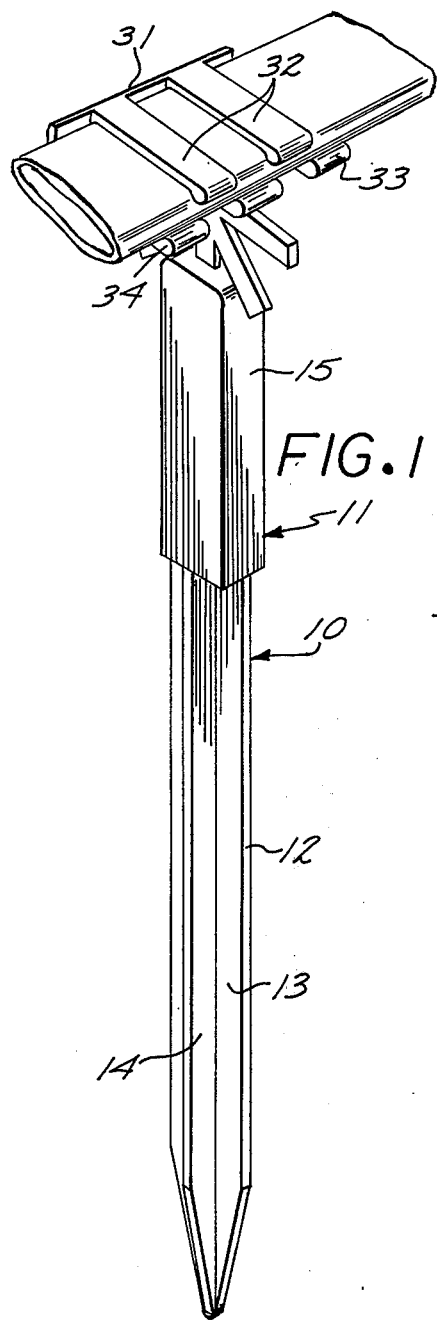
FIG. 1 is a perspective illustration of a soaker hose mounting assembly constructed according to the present invention.
Figure 2:
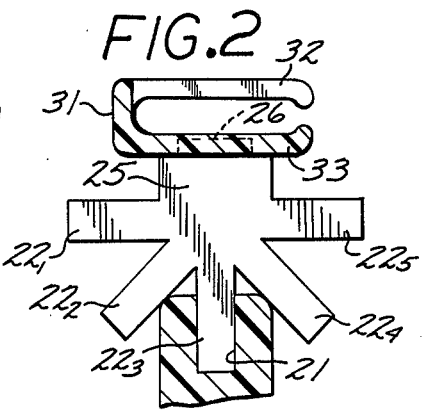
FIG. 2 is a detailed view in section of one embodiment of a mount interface useful with the structure shown in FIG. 1.
Figure 3:
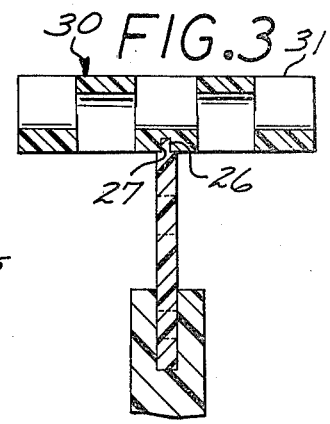
FIG. 3 is a front view detail, in section, of the mount interface shown in FIG. 2.
Figure 4:
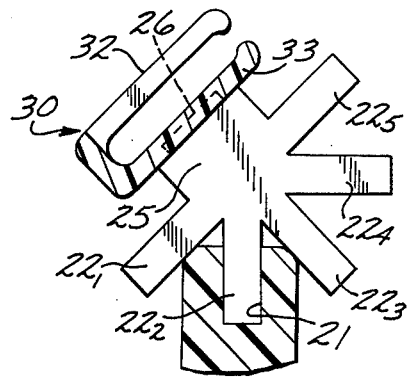
FIG. 4 is an illustration of the mount interface shown in FIG. 2 aligned to an alternate angular alignment.

While the following description is set out at most length by a reference to a single embodiment it is to be understood that the various other alternatives set out are similarly useful and no inference of advantage are to be subsumed from the selection of the examples.

As shown in FIGS. 1, 2, 3 and 4 a soaker hose support assembly generally designated by the numeral 10 comprises as spike 11 including a lower segment 12 formed in the manner of two longitudinally intersecting planar members 13 and 14 extending from the underside of an upper, rectangularly sectioned, segment 15. Segment 15 and members 14 and 13 are formed as a single casting of a high impact plastic such as ABS or a PVC, the free ends of members 13 and 14 being cut to a point. In this configuration, the insertion of the spike 11 is achieved by hammering on the free or upper surface of segment 15 which is therefore enlarged and also of substantial section for the transfer of forces into the point. Formed on the upper surface of segment 15 and extending inwardly therein is a rectangular cavity 21 adapted to receive a selected one of a plurality of conformingly shaped radial elements 22 extending from a support plate 25. Shown specifically are five such radial elements separately identified by the subscripts 1 through 5, elements $22_1$ and $22_5$ extending in opposing directions from the center of mount 25. Thus, by particular reference to FIG. 4 a full 180 degree variation in alignment of support 25 relative the upper segment 15 can be achieved by selective insertion of any one of the elements $22_1$ through $22_5$ into the cavity 21.

It is to be noted that both the support 25 and the elements $22_1$ through $22_5$ radially emanating therefrom comprise a single planar structure cut to the desired planform and dimensioned for receipt within the aforementioned cavity. Formed on the distal or upper edge of support 25 is a reduced projection 26 insertable into yet another cavity 27 formed on the underside of a hose clamp assembly 30.

While other embodiments of a hose clamp are disclosed below, this manner of connection with mount 25 set out presently is contemplated in each instance. Thus by reference to FIGS. 1 through 4, clamp 30 comprises a planar edge member 31 of rectangular planform having a plurality of cantilevered beams or fingers 32 and 33 respectively extending from the upper and lower longitudinal edges thereof. Beams 32 and 33 extend substantially orthogonal to the plane of edge member 31 and are separated at the adjacently opposed faces thereof by a dimension equal or just smaller than the transverse dimensions of a flaccid soaker hose 35. The linear disposition of beams 32 and 33 relative the edge member 31 and relative each other is in a stagger, there being a corresponding gap between the adjacent beams 33 opposing an associated beam of finger 32. This staggered arrangement of beams 32 and 33 reduces the possibility of flow restriction in the soaker hose 35 should undue volumetric changes occur upon pressurization.

Fingers 32 and 33, furthermore, each terminate at the free ends in a bead 34, the disposition of beads 34 being on the interior end surface of each finger thus reducing the effective separation therebetween. This reduced separation of the finger ends provides a grasping engagement around hose 35. While alternative arrangements may be utilized, it is one of the fingers 33 that is shown to include the aforementioned cavity 27 in the exterior surface thereof. It is within this cavity that attachment is made between the mount 25 and the clamp 30. This attachment may be achieved by either a press fit engagement of projection 26 in cavity 27 or by the use of any commonly available adhesives or bonding agents at the interface therebetween.

Figure 5:
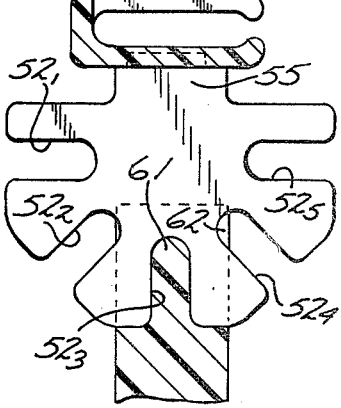
FIG. 5 is yet another embodiment of an interface structure useful with the assembly shown in FIG. 1.

By reference to FIG. 5 an alternative embodiment of the mount and spike interface is set out. More specifically clamp 30 is shown attached, once more by way of a projection 26 received in a cavity 27, to a mount 55. Mount 55 is shaped, once more, as a fan shaped planar structure including a plurality of radially disposed cutouts $52_1$–$52_5$ around the periphery thereof. Cutouts $52_1$–$52_5$ are conformed to receive a transverse structure or spine 61 formed on the interior and extending across a vertical slot 62 in the upper end of spike 11. Once more the appropriate selection of a cutout sets the angular relationship between the mount and the spike.

Figure 6:
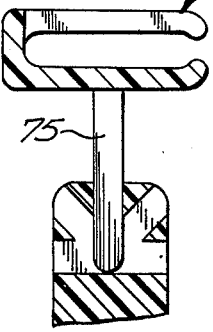
FIG. 6 is a further embodiment of an interface structure set forth herein.

In further alternative, illustrated in FIG. 6 clamp 30 is attached to a single element mount 75 while the upper end of spike 11 is provided with a plurality of conforming cavities $71_1$–$71_5$ again aligned to set the angular disposition of the mount.

Figure 8:
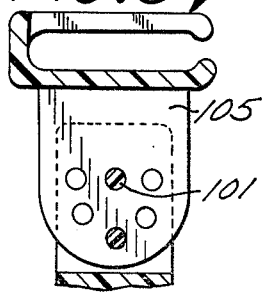
FIG. 8 is yet another embodiment of an interface useful herein.
Figure 9:
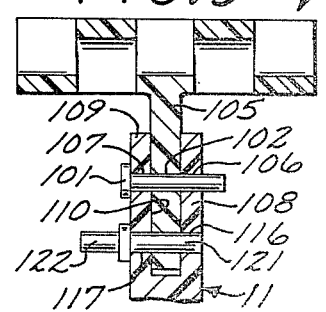
FIG. 9 is a frontal view, in section, of the interface shown in FIG. 8.

The foregoing illustrations each achieve an interface between two separable structures. Thus the hose may be stored with the clamps mounted thereon and conveniently repositioned as required. A further embodiment illustrated in FIGS. 8 and 9 provides a similarly positive angular engagement achieved by virtue of a pivotal post 101 extending through the interior of a pivot bore 102 formed in the substantial center of a mounting plate 105 supporting clamp 30. Post 101 furthermore extends through the common interior of two opposed openings 106 and 107 formed in two tabs 108 and 109 on either side of a transverse slot 110 in the upper end of the spike. Included further in the mounting plate 105 are a plurality of openings $112_1$–$112_5$ radially disposed about the pivot bore 102 which align with the common interior of yet another set of bores 116 and 117 formed in tabs 108 and 109 at an equal radial separation. A further post 121 provided with an extension 122 is selectively insertable in the common interior of bores 116 and 117 and a selected one of the openings $112_1$–$112_5$ to provide the desired angular setting of the clamp relative the spike.

Figure 7:
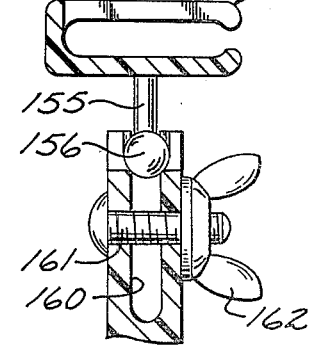
FIG. 7 is a sectional view of an interface structure adapted for various degrees of angular freedom.

In each of the foregoing embodiments, the angular selection of the clamp alignment is in a single plane. Where more than one degree of angular freedom is desired, i.e., where cumbersome irrigation shapes are involved, an alternative embodiment shown in FIG. 7 may be utilized. In this embodiment clamp 30 is supported on a mounting post 155 which, in turn, terminates in a ball 156 receivable in a split socket formed by way of two conforming spherical recesses 157 and 158 on the interior of a slot 160 in the upper end of spike 11. Extending laterally across the slot 160 and the structure of the spike on either side thereof is a bolt 161 which by way of a wing nut 162 either releases or engages the ball within the spherical recesses. This last engagement interface therefore allows for the multiaxis angular dispositions of the clamp relative the spike.

In each of the foregoing examples, the clamp and mounting structure may be left engaged to the hose during storage. Thus various gardening services may be performed without the encumberance of a deployed hose in a manner similar to a fixed sprinkling system. Furthermore once the sprinkling is done the present arrangement allows for a convenient removal of the hose which can then be replaced by a simple installation process. In each instance, the clamping engagement of the hose fixes the linear disposition of the mount assuring a repeatable insertion into spikes left inserted in the ground.

Figure 10:
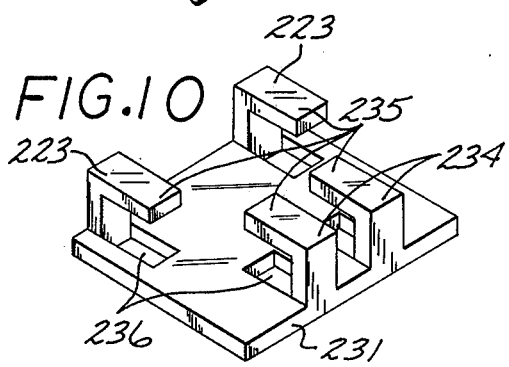
FIG. 10 is a perspective view illustrating an alternative to the clamp shown in the assembly of FIG. 1.

By reference to FIG. 10 an alternative configuration of a clamp is set out. It is to be understood that mounting provisions similar to those set out above may be utilized with this clamping alternative and the foregoing attachment means are described intended herein. As shown in FIG. 10, an alternative hose clamp 230 comprises a rectangular bottom plate 231 having a set of tabs 233 and 234 extending from the distal edges thereof. Tabs 233 and 234 each include inwardly directed end projections 235 separated from plate 231 by a dimension equal to the thickness of the hose. Similar to the prior clamp tabs 233 and 234 are arranged in staggered alignment tabs 234 extending their end projections into the interspace between tabs 233. Disposed along each tab, in subjacent alignment with the corresponding end projection, is an opening 236 for providing relief against flow restriction and a more uniform structural mass for convenience in casting.

Obviously many modifications and variations to the above disclosure can be made without departing from the spirit of the invention. It is therefore intended that the scope of the invention be determined solely dependent on the claims hereto.

We claim:

1. In combination with a soaker hose that has an elongate oval shape transverse cross section and said hose having a plurality of longitudinally spaced water discharge openings therein, a plurality of support assemblies that may removably engage said hose at a plurality of longitudinally spaced positions thereon to selectively hold said hose at any desired one of a plurality of positions relative to the earth surface when said support assemblies are partially embedded in the ground, each of said support assemblies including:
   a. a clamp of channel shape transverse cross section that removably engages said hose and may remain in place on said hose when said hose is not in use, said clamp including a web that has first and second spaced parallel fingers projecting outwardly therefrom that removably engage opposite elongate external side surfaces of said hose, with said first and second fingers defined by first and second longitudinally spaced segments that are staggered relative to one another so that no longitudinal section of said hose is gripped by said segments in such a manner as to obstruct flow of water through said hose;
   b. a spike that includes a lower elongate sharpened portion that may be forced into the ground to occupy a partially embedded position therein, and an upper elongate portion of sufficient strength as to withstand hammer blows directed on the upper extremity thereof to drive said lower portion into the ground;
   c. engageable means adjacent said upper extremity of said upper portion of said stake and forming a part thereof;
   d. a mount secured to said clamp and extending outwardly therefrom, said mount downwardly disposed when said clamp is in a hose supporting position, said mount including engaging means that removably engage said engageable means cooperating to support said clamp and hose at any one of said plurality of positions relative to the ground surface with said mount being a plate transversely positioned relative to said clamp and secured thereto, with said engaging means being a plurality of radially extending, circumferentially spaced segments that form a part of said plate, and said engageable means being a cavity that extends into said upper portion of said spike from said upper extremity thereof, and each of said segments capable of removably engaging said cavity to support said clamp and hose at a desired position relative to the ground surface on said stake; and
   e. first means for preventing said hose from being inadvertently disengaged from said clamp.

2. In combination with a soaker hose that has an elongate oval shape transverse cross section and said hose having a plurality of longitudinally spaced water discharge openings therein, a plurality of support assemblies that may removably engage said hose at a plurality of longitudinally spaced positions thereon to selectively hold said hose at any desired one of a plurality of positions relative to the earth surface when said support assemblies are partially embedded in the ground, each of said support assemblies including:
   a. a clamp of channel shape transverse cross section that removably engages said hose and may remain in place on said hose when said hose is not in use, said clamp including a web that has first and second spaced parallel fingers projecting outwardly therefrom that removably engage opposite elongate external side surfaces of said hose, with said first and second fingers defined by first and second longitudinally spaced segments that are staggered relative to one another so that no longitudinal section of said hose is gripped by said segments in such a manner as to obstruct flow of water through said hose;
   b. a spike that includes a lower elongate sharpened portion that may be forced into the ground to occupy a partially embedded position therein, and an upper elongate portion of sufficient strength as to withstand hammer blows directed on the upper extremity thereof to drive said lower portion into the ground;
   c. engageable means adjacent said upper extremity of said upper portion of said stake and forming a part thereof;
   d. a mount secured to said clamp and extending outwardly therefrom, said mount downwardly disposed when said clamp is in a hose supporting position, said mount including engaging means that removably engage said engageable means cooperating to support said clamp and hose at any one of said plurality of positions relative to the ground surface with said mount being a plate transversely disposed relative to said clamp and secured thereto, with said engaging means being a plurality of radially extending, circumferentially spaced cut outs in said plate, and said engageable means being a spline that extends upwardly from said upper extremity of said upper portion of said spike, and each of said cut outs capable of removably engaging said spline to support said clamp and hose at a desired position relative to the ground surface; and
   e. first means for preventing said hose from being inadvertently disengaged from said clamp.

* * * * *